United States Patent

Thi et al.

Patent Number: 5,868,963
Date of Patent: Feb. 9, 1999

[54] GREEN LUMINOPHOR MATERIAL AND METHOD OF MANUFACTURE

[75] Inventors: Mai Pham Thi, Fresnes; Adéle Le Fur, Gif S/Yvette, both of France

[73] Assignee: Thomson-CSF, Paris, France

[21] Appl. No.: 861,727

[22] Filed: May 22, 1997

[30] Foreign Application Priority Data

May 31, 1996 [FR] France ................................. 96 06739

[51] Int. Cl.[6] .............................. C09K 11/64; C09K 11/55
[52] U.S. Cl. ..................................................... 252/301.4 R
[58] Field of Search ....................................... 252/301.4 R

[56] References Cited

U.S. PATENT DOCUMENTS 4,085,351   4/1978   Takahashi et al. ............... 252/301.4 R

FOREIGN PATENT DOCUMENTS 0 287 167   10/1988   European Pat. Off. .

OTHER PUBLICATIONS

Robertson et al, "luminescet Single Crystal Thin Flims of Manganese Doped Barium Hexa–aluminate", Physica Status Solidi A, vol. 63, No. 1, pp. K59–62, Jan. 16, 1981.

*Primary Examiner*—Melissa Bonner
*Attorney, Agent, or Firm*—Oblon, Spivak, McClelland, Maier & Neustadt, P.C.

[57] ABSTRACT

The disclosure relates to a family of luminophors $Ba_z$-$Al_{12-x}Mn_xO_{19}$ with $0.8 \leq z \leq 1.3$, wherein x ranges from 0.2 to 0.7 and has a time of decay, to 10% of the light energy emitted, of less than about 15 ms. It also relates to a method for the manufacture of this family of luminophors having a time of decay, to about 10% of the initial light intensity emitted, of less than about 15 ms. It also relate to a method for the manufacture of this family of luminophors, using a primary vacuum step in order to obtain a neutral or reductive atmosphere with an oxygen content of less than about 10 particles per million (ppm). This method has the great value of enabling the formation of barium hexa-aluminate with a high manganese content to lower the decay time while, at the same time, preserving high luminous efficiency. Application to high-definition television.

15 Claims, 2 Drawing Sheets

GREEN LUMINOPHOR MATERIAL AND METHOD OF MANUFACTURE

BACKGROUND OF THE INVENTION

1. Field of the Invention

The invention relates to green luminophor materials having high luminous efficiency and luminous persistence or afterglow adapted to television applications and more specifically to high-definition plasma screens.

Indeed, in this type of application, it is sought to obtain luminous persistence values or times of decay, to 10% of the initial intensity emitted, typically lower than about fifteen milliseconds in order to avoid the trailing effect in the images.

2. Description of the Prior Art

At present, there are plasma panels available whose emitted radiation excites the luminophors capable of emitting in the visible range of the spectrum. The luminophors contain a reactive gas (a mixture of xenon and neon) which, by electrical discharge, produces light radiation in the short ultraviolet range, between 140 and 170 nm, also called VUV radiation. This light radiation is especially adapted to certain groups of luminophors, especially to barium hexa-aluminates which are already known to have high luminous efficiency under UV excitation, towards 250 nm. The color of emission of the luminophor is governed by the nature of the activator dispersed in the matrix. The activator is, in particular, europium for blue and manganese for green.

In the case of manganese-doped hexa-aluminates with the general formula $Ba_z$-$Al_{12-x}Mn_xO_{19}$ with $0.8 \leq z \leq 1.3$, and x is $\leq 0.06$ the emission is at 517 nm for luminous excitation in the neighborhood of 220 nm. For example, the commercial product Kx502 produced by Kyoko has a decay time of the order of 18 to 20 ms for a quantum yield in the neighborhood of 0.9. Analyses have shown that its manganese content x is in the region of 0.05.

This type of commercially available product has a decay time that is excessively long for the applications in view, where decay times of less than 15 ms and even 10 ms are sought.

Furthermore, it is known that to obtain a reduction of the decay time, the manganese content x can be increased.

Luminophors of this kind are manufactured according to a standard method that uses the heating of a mixture of oxides and salts containing the elements that constitute the luminophor. This heating is done in an oven, at a temperature such that the formation of the desired crystalline phase of the luminophor is obtained. In the specific case of barium hexa-aluminates, this is the spinel structure of β alumina.

Nevertheless, tests carried out in non-sealed ovens under nitrogen atmosphere or under nitrogen and hydrogen reductive atmosphere show that increasing the manganese concentration fosters the creation of $Mn^{3+}$ or $Mn^{4+}$ ions to the detriment of $Mn^{2+}$ ions. This phenomenon tends to reduce the luminous efficiency of the luminophor, inasmuch as the efficient ions in terms of luminous efficiency are the divalent $Mn^{2+}$ ions.

SUMMARY OF THE INVENTION

This is why the invention proposes a method for the manufacture of luminiphor materials $Ba_z$-$Al_{12-x}Mn_xO_{19}$ with x greater than about 0.2 and z ranging from about 0.8 to 1.3.

And more broadly, an object of the invention is a method for the manufacture of a luminophor material based on manganese-doped barium hexa-aluminate with the general formula $Ba_z$-$Al_{12-x}Mn_xO_{19}$ with $0 \leq x \leq 1$ and with $0.8 \leq z \leq 1.3$, wherein x is greater than about 0.2 and smaller than about 0.7 and wherein it has a time of luminous persistence, at about 10% of the initial light intensity emitted, of less than about 15 ms.

Advantageously, the luminophor material is one wherein x is close to 0.3 and its time of decay is close to 10 milliseconds.

An object of the invention is also a method for the manufacture of a luminophor material based on manganese-doped barium hexa-aluminate with the general formula $Ba_z$-$Al_{1-x}Mn_xO_{19}$, with x greater than about 0.3 and with z ranging from 0.8 to 1.3, said method comprising:

- the mixing of salts or oxides containing the elements Al, Mn and Ba in a heating chamber;
- the setting up of a neutral or reductive atmosphere in the heating chamber, having a quantity of oxygen less than about 10 particles per million (ppm);
- the raising of the temperature of the heating chamber to a temperature Tf of formation of the luminophor $Ba_z$-$Al_{1-x}Mn_xO_{19}$.

BRIEF DESCRIPTION OF THE DRAWINGS

The invention shall be understood more clearly and other advantages shall appear from the following description, given by way of a non-restrictive example, by means of the appended figures, of which.

Figure 2:
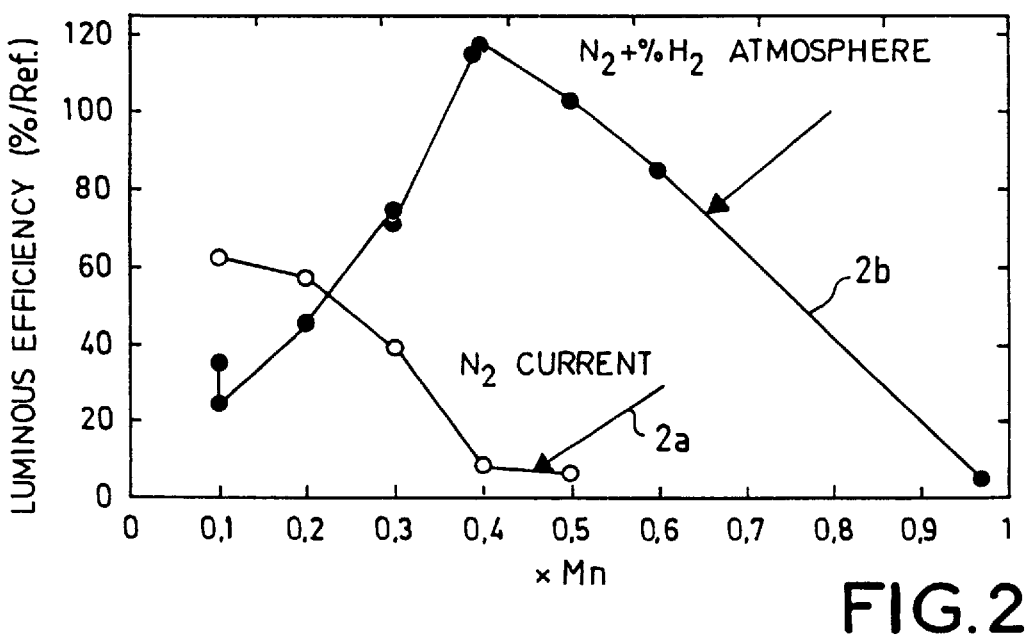
Figure 3:
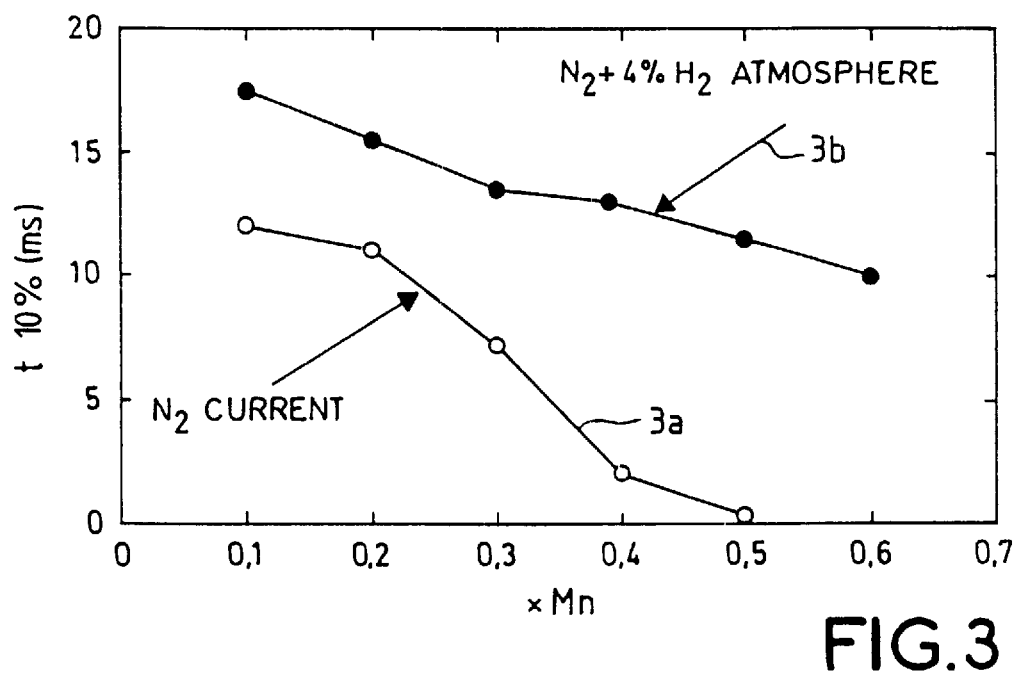

- the curve 1a corresponds to the progress of the luminous efficiency as a function of the content x;
- the curve 1b corresponds to the progress of the decay time as a function of the content x;

FIG. 2 illustrates the progress of the luminous efficiency as a function of the manganese content for a group of luminophors $Ba_{0.8}$-$Al_{12-x}Mn_xO_{19}$:

- the curve 2a pertains to a group of luminophors prepared under nitrogen current;
- the curve 2b pertains to a group of luminophors prepared under reductive atmosphere;

FIG. 3 illustrates the progress of the decay time as a function of the manganese content for a group of luminophors $Ba_{0.8}$-$Al_{12-x}Mn_xO_{19}$;

- the curve 3a pertains to a group of luminophors prepared under nitrogen current;
- the curve 3b pertains to a group of luminophors prepared under reductive atmosphere.

MORE DETAILED DESCRIPTION

All the luminous efficiency values are given in terms of percentage with respect to the commercial product Kx502.

The luminophor materials according to the invention may advantageously be prepared according to the following method:

Salts or oxides containing Al, Mn, Ba are mixed in a liquid container by means of a mixer (of the Turbulat type). The powder obtained is dried and screened, then poured into an alumina crucible. The crucible is introduced into the tube oven, provided with impervious closing means.

A primary vacuum leading to a pressure in the region of 10–2 mbars is set up in the oven.

Then, a current of dry nitrogen containing at most a quantity of oxygen of about 10 ppm is made to flow.

The material is heated to 1400° C. or 1550° C. for two hours.

Figure 1:
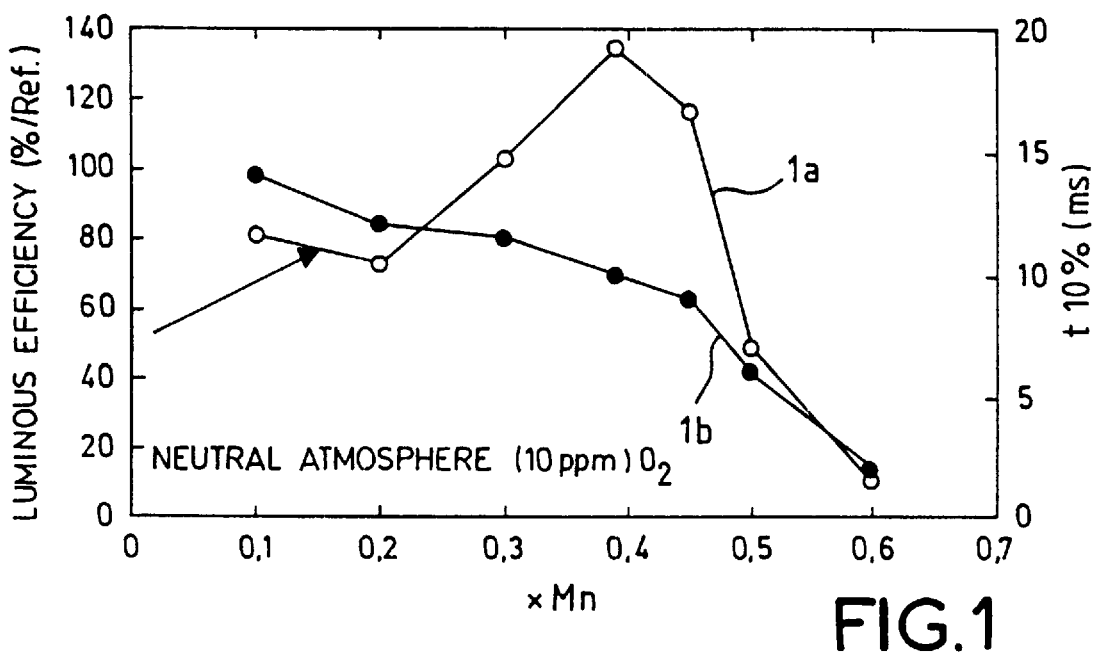
FIG. 1 illustrates the performance characteristics obtained with a group of luminophors $Ba_{0.8}$-$Al_{12-x}Mn_xO_{19}$ prepared according to a method of the invention, as a function of the manganese content X.

When a study is made of the performance characteristics obtained with a group of luminophors as a function of the manganese content, the results given in FIG. 1 are observed. The study concerns a set of $Ba_{0.8}$-$Al_{12-x}Mn_xO_{19}$ compounds.

The curves 1a and 1b show that very high performance characteristics have been obtained in terms of luminous efficiency and decay time for values of x ranging from 0.3 to 0.5.

These results must be compared with those of FIGS. 2 and 3.

For, the results presented in FIGS. 2 and 3 are obtained with the same group of luminophors synthesized firstly under nitrogen current, without any preliminary vacuum step (curves 2a and 3a) and, secondly, in a reductive atmosphere under nitrogen current in the presence of hydrogen.

The experiments carried out in a reductive atmosphere are interesting inasmuch as they show that, under these conditions, the luminous efficiency is increased, i.e. that the formation of $Mn^{2+}$ ions is obtained but that the decay time is not reduced.

It can clearly be seen from FIGS. 2a and 2b that, under a reductive atmosphere, it is possible to increase the luminous efficiency as compared with that obtained from a synthesis carried out conventionally in a neutral environment. However, the curves 3a and 3b show that it is necessary to find a compromise inasmuch as a reductive atmosphere appreciably increases the decay time. Indeed, the increase in the luminous efficiency in the presence of a reductive atmosphere is very probably related to the more efficient dispersal of the manganese ions in the matrix. However, the presence of aggregates in the atmosphere under a neutral atmosphere has the valuable characteristic of giving rise to a shorter decay time (it is possible, especially with $0.5 \leq x \leq 0.7$ to obtain a decay time of 10 ms).

The first curves 1a and 1b indicate the value of the method of the invention and of the material obtained which, for levels of manganese content x greater than about 0.3, has a luminous efficiency value and a decay time quite suited to the constraints encountered in the field of high definition television.

As a rule, the size of the luminophor grains obtained depends on the size of the alumina used as a raw material. The powder prepared according to one method of the invention at 1550° has a mean grain size of 15 μm. The grains agglomerate to form large agglomerates of 300 μm. It is necessary to envisage a grinding step for high-definition television applications in which grain size values of the order of some microns are recovered to obtain a better definition of the pixels.

This is why, according to one variant of the method of the invention, a grinding step is performed, in which the powder obtained according to the method of the invention is placed in suspension in water in the presence of grinding beads with a diameter of 1 to 2 mm.

Typically, the suspension may be introduced into a rigid flask in a turntable and the entire unit may be made to rotate for several hours. The collision between the beads during the rotational motion leads to efficient grinding. It is thus possible to obtain a dispersal of the aggregates and the mean size of the grains is then smaller than 2 μm. This fine power loses only 5% of its luminous efficiency while its decay time does not vary. This is an important aspect inasmuch as, generally, the grinding steps tend to downgrade the properties of the luminophors. Examples of the making of luminophors according to the invention

EXAMPLE 1

A suspension of 152 g of alumina ($Al_2O_3$), 39 g of barium carbonate ($BaCO_3$), 13.4 g of manganese carbonate is made in 0.2 litres of water by means of a mixer for four hours.

After shaking, the water is evaporated in a stove at 60° C. A powdery mixture is obtained and introduced into an alumina crucible. The crucible is closed with an alumina lid and placed in an imperviously sealed oven. The oven is placed under primary vacuum to remove the air from the heat-treatment atmosphere. The heat treatment is done at 1450° C. under a current of dry nitrogen for two hours.

The product obtained after heat treatment is a white power with a mean grain size of 10 μm. The luminous efficiency is about 110% as compared with the commercial product Kx502produced by Kyoko.

The time of decay to 10% of the initial light intensity is 10 ms.

The mean grain size can be adjusted as a function of the heat-treatment temperature. The following table shows variations in the luminous efficiency as a function of this heat-treatment temperature, but the decay time remains constant.

| HEAT-TREATMENT TEMPERATURE | MEAN GRAIN SIZE | EFFICIENCY |
| --- | --- | --- |
| 1 350 | 8 | 130 |
| 1 400 | 9 | 127 |
| 1 450 | 10 | 122 |
| 1 550 | 12 | 100 |

EXAMPLE 2

To improve the mean grain size, the luminophor of the example 1 is placed in suspension in water with zirconia beads having a diameter of 2 mm.

The composition is 20 g of luminophor, 150 g of beads and 0.1 liter of water.

The suspension is made to rotate by means of a turntable for 17 hours. The mixture is poured into a screen to recover the beads. The suspension is washed and the powder is recovered by centrifugation. The mean grain size is 1.5 to 2 μm. The powder has a yield of 105% as compared with the commercially available product Kx502and a decay time of 10.5 ms.

EXAMPLE 3

The results obtained on the crystalline phase φ1 of the group $Ba_{0.8}$-$Al_{12-x}Mn_xO_{19}$ are also confirmed on the crystalline phase φ1 of the group $Ba_{1.3}$—$Al_{12-x}Mn_xO_{19}$.

EXAMPLE 4

Hundred grams (102 g) of alumina γ ($Al_2O_3$-γ), 43 g of barium carbonate ($BaCO_3$) and 16 g of aluminium fluoride $AlF_3$ are put into suspension in three hundred and fifty three centilitres of a standard solution of manganese sulphate by means of a mixer for four hours. The water is then evaporated by drying in an epiradiator. During evaporation, the barbotine is mixed by means of a magnetic shaker to homogenize the distribution of manganese. After drying, a powdery mixture is obtained. This powdery mixture is introduced into an alumina crucible. The crucible is closed with an alumina lid and placed in a tightly sealed oven. The oven is placed under primary vacuum to remove the air from the heat-treatment atmosphere. The heat treatment is done at 1550° C. under a current of dry nitrogen for two hours.

The powder obtained after cooking is a white powder whose mean grain size is 13 μm. The luminous efficiency is about 100% as compared with the luminophor described in the above examples. The time of decay to 10% is 11 milliseconds.

What is claimed is:

1. A method of producing a luminophor represented by the formula:

$$Ba_z\text{-}Al_{12-x}Mn_xO_{19},$$

wherein z is 0.8 to 1.3, and x is greater than about 0.2 and at most about 0.7, comprising:

heating in a reducing or a neutral atmosphere having an oxygen concentration of at most 10 particles per million (ppm) a mixture containing salts or oxides comprising the elements Al, Mn and Ba to a temperature of formation (Tf) of said luminophor.

2. The method of claim 1, wherein x is greater than about 0.2 and less than about 0.7.

3. The method of claim 1, wherein x is greater than about 0.3 and less than about 0.7.

4. The method of claim 1, wherein x is 0.3 to 0.5.

5. The method of claim 1, wherein x is 0.5 to 0.7.

6. The method of claim 1, wherein the heating step is conducted at a temperature of 1400° C. to 1550° C.

7. The method of claim 1, wherein said atmosphere is reducing.

8. The method of claim 1, wherein said atmosphere is neutral.

9. The method of claim 1, wherein said atmosphere comprises nitrogen.

10. The method of claim 1, wherein said atmosphere comprises nitrogen and hydrogen.

11. The method of claim 1, wherein the heating step is conducted in a crucible.

12. The method of claim 1, wherein said luminophor has a time of luminous persistence of less than about 15 milliseconds.

13. The method of claim 1, wherein said luminophor has a time of decay of about 10 milliseconds.

14. The method of claim 1, further comprising grinding the luminophor obtained from said heating step with grinding beads in a liquid medium.

15. The method of claim 14, wherein said grinding beads are zirconia.

* * * * *